Feb. 21, 1950   A. C. FERGUSON   2,498,107
TOOL HANDLE
Filed Feb. 1, 1946

INVENTOR.
Alan C. Ferguson
BY Charles R. Fay, atty.

Patented Feb. 21, 1950

2,498,107

UNITED STATES PATENT OFFICE 2,498,107

TOOL HANDLE

Alan C. Ferguson, Southbridge, Mass., assignor to Hyde Manufacturing Company, Southbridge, Mass., a corporation of Massachusetts Application February 1, 1946, Serial No. 644,780

1 Claim. (Cl. 30—342)

This invention relates to tool handles and fastenings therefor.

Objects of the invention include the provision of a new and improved tool handle and tool handle fastening which gives a smoother, better grip and is easier to assemble and therefore more economical to manufacture.

Other objects of the invention include the provision of a tool handle comprising a pair of half-handles adapted to be secured at either side of a tang, said handles having interengaging shoulders fitting recesses in the tang for correct alignment of the parts without the use of a jig and without mismating, thereby doing away with the usual finish polishing of the handle and ensuring correct alignment; and the provision of a tool having a tang, said tang having reduced edge sections forming shoulders, and a pair of like handle parts having reduced ends, said handle parts having edges located by the reduced edge sections of the tang and the reduced ends of the handle parts locating the shoulders in the tang so that the handle parts and tang are easily and quickly located relative to each other for the securing operation, the latter usually being accomplished by rivets.

Other objects and advantages of the invention will appear hereinafter.

Reference is to be had to the accompanying drawing, in which

Figure 1:
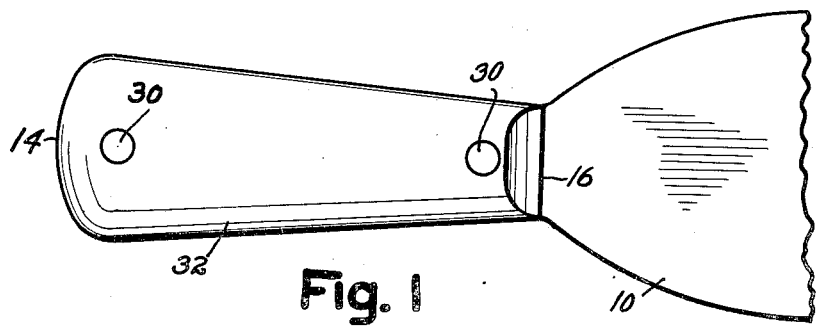
Fig. 1 is a top plan view of a tool according to the present invention, the blade of the tool being broken away.
Figure 2:
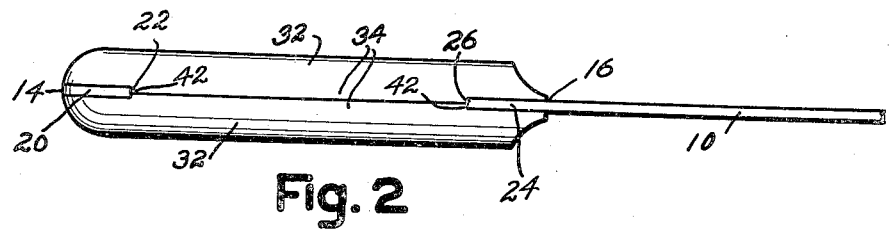
Fig. 2 is a view in edge elevation of the tool of Fig. 1.
Figure 3:
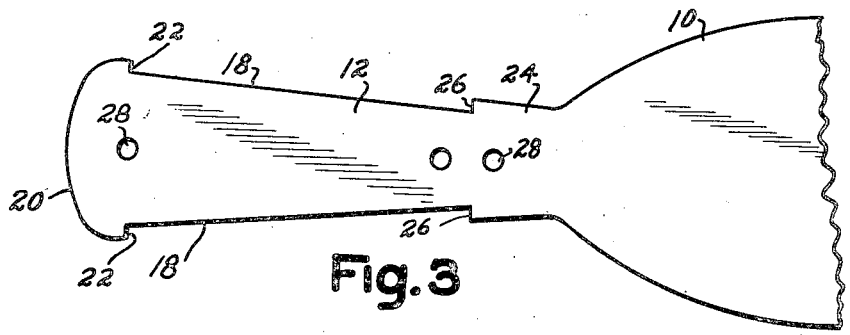
Fig. 3 is a top plan view of the tool with handle parts removed.
Figures 4, 5:
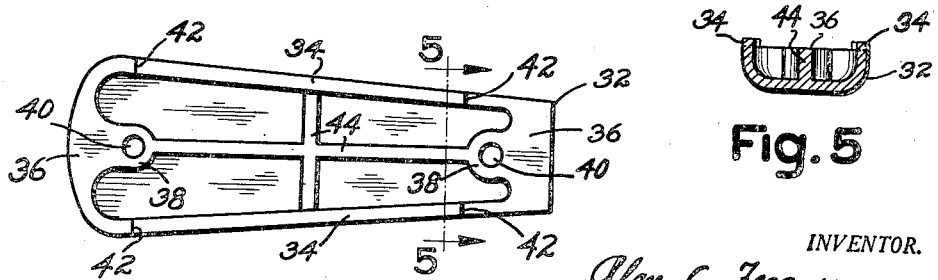
Fig. 4 is a bottom plan view of a handle part.
Fig. 5 is a section in line 5—5 of Fig. 4.

With many tools, such as scrapers, the handle often comprises a pair of like shaped parts flatly set on and riveted to the tang of the blade. This has been found to necessitate grinding the meeting edges of the handle parts because it is extremely difficult to exactly match the parts to the tang during riveting, and one or both parts often become skewed relative to the tang. The present invention obviates these difficulties and results in a smoother handle at less cost.

A scraper has been used to illustrate the invention, but any tool may be used in carrying out the invention. A blade (or shaft, etc.) 10 is made with or has attached thereto a tang 12, the latter extending from the heel of the handle at 14 to the exposed blade at 16. The tang is formed with edge reductions at 18 forming a head 20 having shoulders 22 and an enlarged neck 24 having shoulders 26 facing shoulders 22. Holes 28 are provided for the fastening rivets 30.

Half handles 32 are exactly alike and conform in outline to the shape of handle desired and in general to the tang. Each half-handle part is in the form of a shell having side walls 34, flat ends 36, and bosses 38 containing holes 40 for the rivets. The side walls extend outwardly of the plane of the flat ends forming shoulders 42, these shoulders each being one-half the thickness of the tang in height.

The side walls 34 have a thickness equal to the depth of the edge recesses or reductions 18 in the tang, i. e., the shoulders 22 are equal in width to the thickness of the side walls, the latter conforming in shape to the form of the tang edges. The handle parts may be generally hollow for lightness and tool balance and to save material. Ribs 44 terminating in the plane of the flat ends may be used to stiffen and strengthen the handles.

It will be clear that a handle part is easily applied to the tang and must be placed thereon in correct position only with shoulders 42 engaging those at 22 and 26, and with the edges of recesses 18 engaging the side walls 34. This must result in correct positioning of all the parts for the riveting or other fastening operation, whereas if the handle parts were flat on the tang, they would not necessarily be placed correctly, and after fastening, smoothing and grinding off operations would have to be made. The side walls 34 just come together and give the finished product the appearance of having a solid one piece handle except for the tang head 20 which is exposed at its edge only.

Having thus described my invention and the advantages thereof, I do not wish to be limited to the details herein disclosed, otherwise than as set forth in the claim, but what I claim is:

A tool handle comprising a generally flat tang having recesses in opposite side edges thereof, said recesses forming shoulders at each edge of the tang, a pair of hollow handle parts having flats at each end for contact with the faces of the tang, edge extensions on the handle parts filling the recesses said extensions forming shoulders for locating contact with the tang shoulders, a central longitudinal rib in each handle part, said ribs terminating flatly in the planes of the flats to contact the tang at opposite sides thereof, and a flat head on the tang, said head being edgewise exposed at an end of the handle.

ALAN C. FERGUSON.

REFERENCES CITED

The following references are of record in the file of this patent:

UNITED STATES PATENTS

| Number | Name | Date |
|---|---|---|
| 86,252 | Rubel | Jan. 26, 1869 |
| 1,754,543 | Callum | Apr. 15, 1930 |
| 2,271,290 | Echikson | Jan. 27, 1942 |